United States Patent
Lessin et al.

(10) Patent No.: US 10,592,558 B2
(45) Date of Patent: *Mar. 17, 2020

(54) USER-CARD INTERFACES

(71) Applicant: Facebook, Inc., Menlo Park, CA (US)

(72) Inventors: Samuel Wharton Lessin, San Francisco, CA (US); Robert M. Baldwin, San Francisco, CA (US); Jeffrey Huang, Mountain View, CA (US); Timothy A. Stanke, Los Gatos, CA (US); Caitlin Rothrock Winner, San Francisco, CA (US); Matthew Vincent Sain, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,893

(22) Filed: Sep. 18, 2017

(65) Prior Publication Data
US 2018/0004861 A1  Jan. 4, 2018

Related U.S. Application Data

(63) Continuation of application No. 14/231,049, filed on Mar. 31, 2014, now Pat. No. 9,798,832.

(51) Int. Cl.
*G06F 16/9038* (2019.01)
*G06F 16/901* (2019.01)
(Continued)

(52) U.S. Cl.
CPC ........ *G06F 16/9038* (2019.01); *G06F 16/242* (2019.01); *G06F 16/9024* (2019.01);
(Continued)

(58) Field of Classification Search
CPC ........ G06F 17/30991; G06F 17/30389; G06F 17/30958; G06Q 10/10; G06Q 30/02
(Continued)

(56) References Cited

U.S. PATENT DOCUMENTS

2011/0307478 A1* 12/2011 Pinckney ............. G06N 99/005
707/724
2012/0078906 A1*  3/2012 Anand ............. G06F 17/30702
707/737

(Continued)

*Primary Examiner* — Hosain T Alam
*Assistant Examiner* — Nicholas E Allen
(74) *Attorney, Agent, or Firm* — Baker Botts L.L.P.

(57) ABSTRACT

In one embodiment, a method includes receiving, from a client system associated with a first user, a request to access a user-card interface. The method includes generating, in response to the request, multiple user-cards, each user-card being associated with a pre-selected query. Each user-card includes references to second users matching the pre-selected query associated with the user-card. The method includes calculating a user-card score for each user-card. The user-card score represents a relevance of the pre-selected query to the first user and a relevance of the second users referenced in the user-card to the first user. The relevance of each second user referenced in the user-card is based on an affinity coefficient of the first user with respect to the second user. The method includes sending, to the client system, instructions for presenting the user-card interface with user-cards in ranked order based on the user-card score associated with each user-card.

21 Claims, 14 Drawing Sheets

(51) Int. Cl.
*G06Q 50/00* (2012.01)
*G06Q 10/10* (2012.01)
*G06Q 30/02* (2012.01)
*G06F 16/242* (2019.01)

(52) U.S. Cl.
CPC ............. *G06Q 10/10* (2013.01); *G06Q 30/02* (2013.01); *G06Q 30/0269* (2013.01); *G06Q 50/01* (2013.01)

(58) Field of Classification Search
USPC .......................................... 709/609; 707/609
See application file for complete search history.

(56) References Cited

U.S. PATENT DOCUMENTS

| | | | | |
|---|---|---|---|---|
| 2013/0024465 A1* | 1/2013 | Schiff | ............... | G06F 17/30873 707/749 |
| 2013/0036112 A1* | 2/2013 | Poon | ................. | G06F 17/30864 707/723 |
| 2013/0073568 A1* | 3/2013 | Federov | ............ | G06F 17/30867 707/749 |
| 2013/0103697 A1* | 4/2013 | Hill | .................... | G06F 17/30312 707/748 |
| 2013/0124504 A1* | 5/2013 | Haugen | ............. | G06F 17/30864 707/722 |
| 2013/0204886 A1* | 8/2013 | Faith | .................. | G06Q 30/0631 707/756 |
| 2013/0254305 A1* | 9/2013 | Cheng | ..................... | H04L 51/32 709/206 |
| 2013/0290234 A1* | 10/2013 | Harris | .................... | G06N 5/022 706/46 |
| 2013/0297590 A1* | 11/2013 | Zukovsky | ......... | G06F 17/30867 707/722 |
| 2014/0019545 A1* | 1/2014 | Kosugi | ................. | H04L 65/403 709/204 |
| 2014/0040243 A1* | 2/2014 | Rubinstein | ........ | G06F 17/30554 707/722 |
| 2014/0066044 A1* | 3/2014 | Ramnani | ................. | H04W 8/24 455/418 |
| 2014/0089287 A1* | 3/2014 | Connolly | .......... | G06F 17/30991 707/707 |

* cited by examiner

USER-CARD INTERFACES

PRIORITY

This application is a continuation under 35 U.S.C. § 120 of U.S. patent application Ser. No. 14/231,049, filed 31 Mar. 2014, which is incorporated herein by reference.

TECHNICAL FIELD

This disclosure generally relates to presentation of information on a computing device within a social-networking environment or related environments.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a social-networking system may generate structured queries that include references to particular social-graph elements. These structured queries may be generated, for example, in response to a text query provided by a first user, generated as default queries based on an input from the first user, or generated as default queries automatically without input from the first user. By generating structured queries without explicit user input, the social-networking system may provide a powerful way for users of an online social network to view elements in a social graph that they may desire to view without creating an express text query for those elements.

In particular embodiments, the user-card interface may be a visual model indicating which other users are associated with particular concepts or entities on the social graph. The first user may be presented with one or more user-cards, where each user-card corresponds to a structured query of the social graph. Each user-card will contain references to one or more second users who match the structured query for that user-card. This allows the first user to view users grouped by particular ideas or categories. For example, the first user may view user-cards for "People With Upcoming Birthdays," or "Watching a Movie Right Now," and see one or more second users who correspond to those categories. References to one or more second users may be displayed within each user-card. The first user may select a user-card to look at more second users that may be displayed within the user-card, and may select particular second users to view more information about the second user or to interact with the second user. Additional interactive elements for interacting with the user-card or individual second users may be displayed. The first user may indicate a preference for particular user-cards. The first user may indicate a preference to not view particular user-cards, and those user-cards will be removed from the user-card interface.

In particular embodiments, a user-card score for each user-card may be calculated. The user-card score may be based at least in part on the relevance of the structured query corresponding to the user-card to the first user. The user-card score may be based at least in part on a calculated likelihood that the first user will interact with the user-card. The user-card score may be based at least in part on the current or future geographic location of the first user. The user-card score may be calculated based at least in part on any other factors recorded by the social-networking system that may indicate an affinity for the first user with respect to the contents of the user-card. In particular embodiments, only user-cards with user-card scores exceeding a threshold user-card score may be displayed in the user-card interface. In particular embodiments, the user-cards displayed in the user-card interface may be arranged in a ranked list according to their user-card scores.

In particular embodiments, the social-networking system may calculate a user-score for each second user displayed in a user-card. The user-score for a second user may be based at least in part on the affinity of the first user with respect to the second user. The user-score for a second user may be based at least in part on the affinity of the second user with respect to the nodes referenced by the structured query corresponding to the user-card.

In particular embodiments, the first user may apply a query-filter to one or more user-cards. The query-filter may reference additional nodes or edges of the social graph, or remove existing references. The social-networking system may update the generated user-cards based on the query-filter. The user-card scores for each user-card may be updated based on the query-filter. The user-scores for each second user may be updated based on the query-filter. The user-cards may be re-ranked based on their updated user-card scores. The second users may be re-ranked based on their updated user-scores.

In particular embodiments, the first user may indicate that he or she also belongs to a particular user-card. In response, the social-networking system may update the generated user-cards based on the query-filter. The user-card scores for each user-card may be updated based on the query-filter. The user-scores for each second user may be updated based on the query-filter. The user-cards may be re-ranked based on their updated user-card scores. The second users may be re-ranked based on their updated user-scores. The social-networking system may associate the first user with the structured query corresponding to that user-card, placing the first user in similar user-cards viewed by other users.

In particular embodiments, the second users in the user-cards may be drawn from all users of the social-networking system based on a multi-signal social affinity determined with respect to the first user. The multi-signal social affinity may be used to calculate a contact-score for each user. The contact-score may be used to determine if the second user is known to the first user. A second user having a contact-score above a threshold contact-score may be placed in a user-list for the first user. The first user may be able to view the user-list containing all second users determined to be known to the first user. The first user may interact with the displayed second users, and may remove particular second users from the user-list. The social-networking system may use the user-list when generating user-cards for the first user.

Although the term "user-card" is used to describe this invention, the concept of this invention is applicable to all social graph entities, and even third-party entities.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

System Overview

Figure 1:
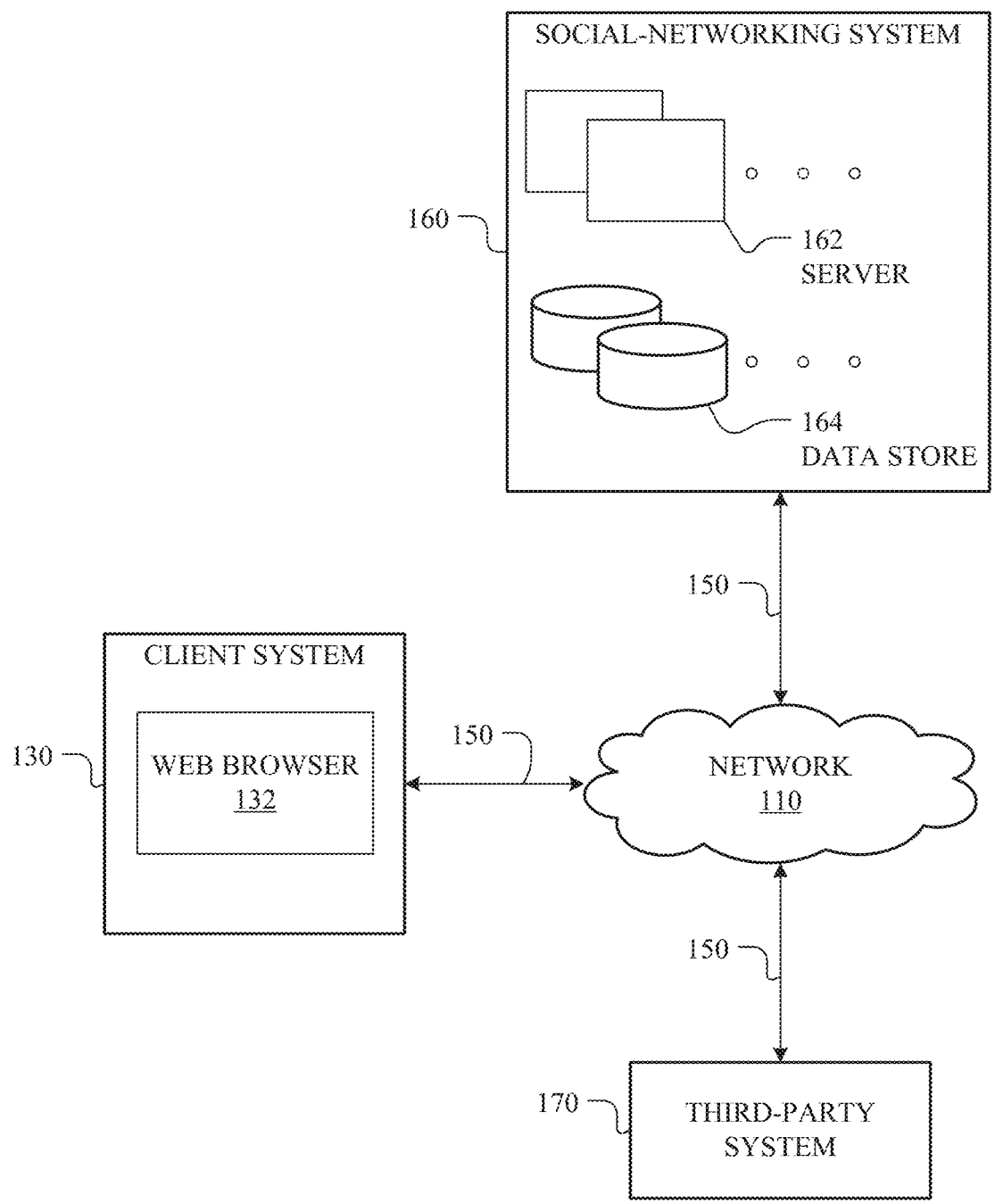
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
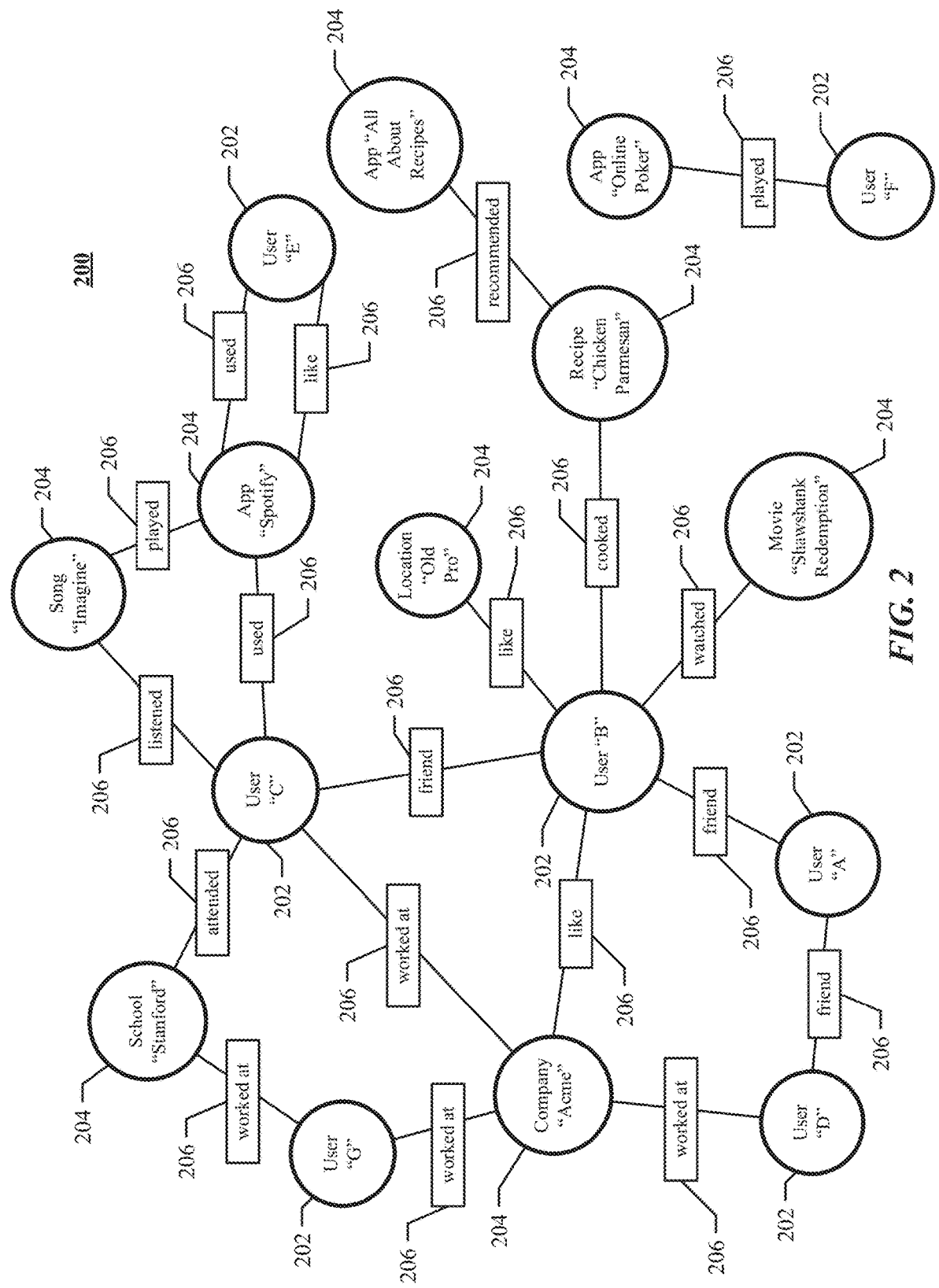
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Mobile Client Systems

Figure 3:
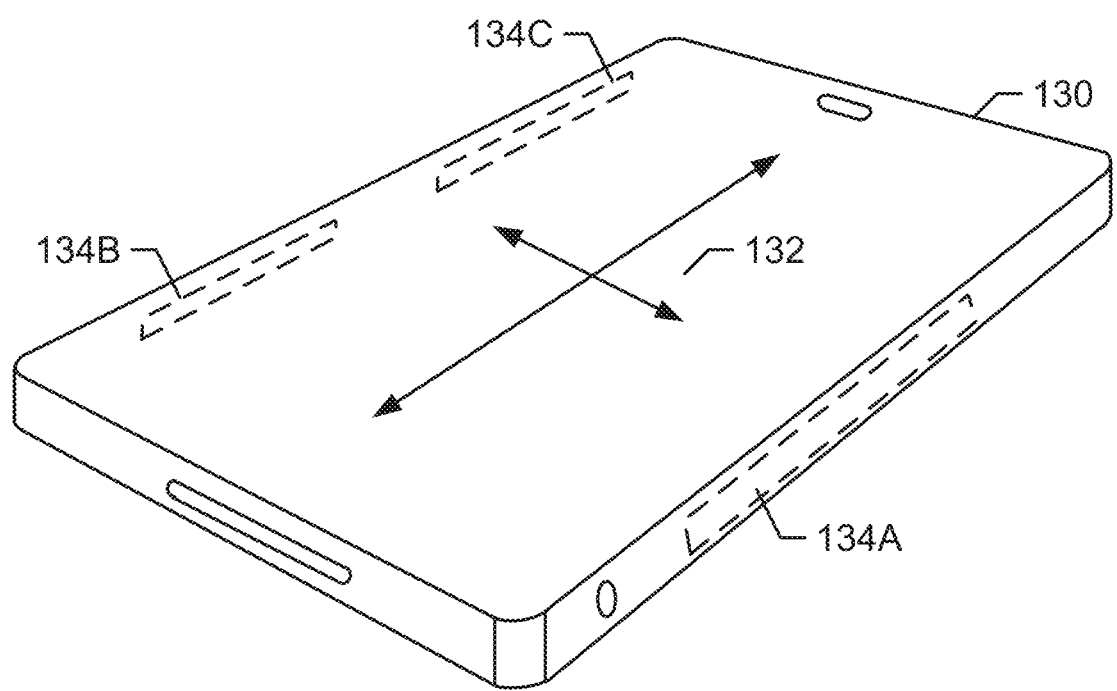
FIG. 3 illustrates an example mobile client system.

FIG. 3 illustrates an example mobile client system 130. This disclosure contemplates mobile client system 130 taking any suitable physical form. In particular embodiments, mobile client system 130 may be a computing system as described below. As example and not by way of limitation, mobile client system 130 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile client system 130 may have a touch sensor 132 as an input component. In the example of FIG. 3, touch sensor 132 is incorporated on a front surface of mobile client system 130. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 3, one or more antennae 134A-B may be incorporated into one or more sides of mobile client system 130. Antennae 134A-B are components that convert electric current into radio waves, and vice versa. During transmission of signals, a transmitter applies an oscillating radio frequency (RF) electric current to terminals of antenna 134A-B, and antenna 134A-B radiates the energy of the applied the current as electromagnetic (EM) waves. During reception of signals, antennae 134A-B convert the power of an incoming EM wave into a voltage at the terminals of antennae 134A-B. The voltage may be transmitted to a receiver for amplification.

In particular embodiments, mobile client system 130 many include a communication component coupled to antennae 134A-B for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component 20 for it. As an example and not by way of limitation, mobile client system 130 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile client system 130 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile client system 130 may include any suitable communication component for any of these networks, where appropriate.

In particular embodiments, the communication component coupled to antennae 134A-B mobile client system 130 may be configured to determine location data based on global positioning system (GPS) signals, cellular triangulation, wireless hotspots, or any suitable methods for determining location data. In particular embodiments, the location service of mobile client system 130 may use one or more methods of location determination, such as for example, using the location of one or more cellular towers, crowd-sourced location information associated with a WI-FI hotspot, or a GPS function of mobile client system 130. As an example and not by way of limitation, the application may use GPS data as the primary source of location information depending at least in part on whether mobile client system 130 is able to acquire GPS data within a pre-determined period of time. As another example, if mobile client system 130 is unable to acquire the GPS data within the pre-determined sampling duration, the application may use the location determined using one or more cellular towers or WI-FI hotspots. Although this disclosure describes a location service using particular methods of location determination, this disclosure contemplates a location service using any suitable method or combination of methods of location detection.

User Cards

Figure 4:
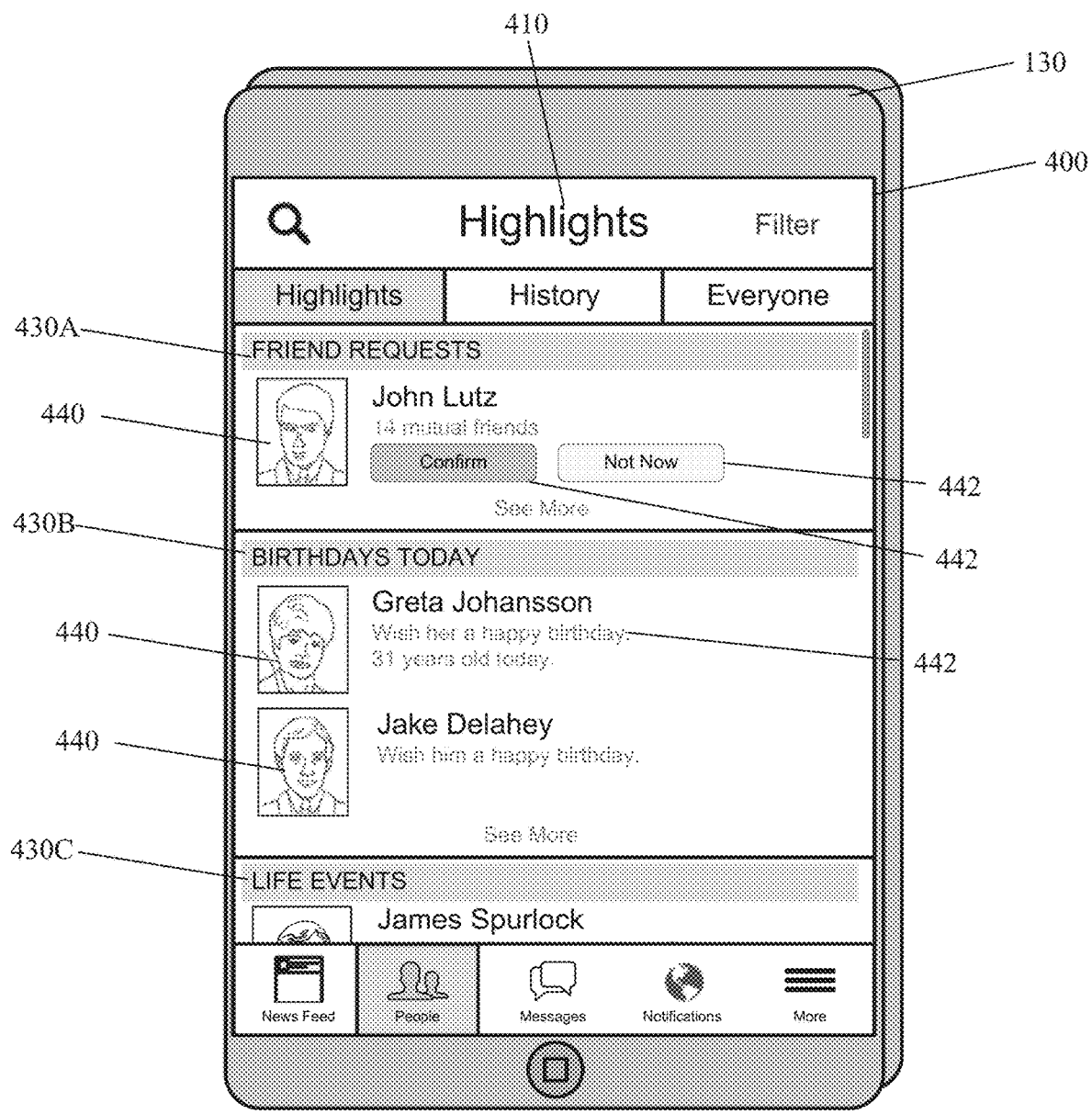
FIG. 4 illustrates an example user-card interface for displaying user-cards.

FIG. 4 illustrates an example user-card interface. One or more "user-cards" 430A-C of a user-card interface 410 may be displayed in display area 400 of a mobile client system 130 belonging to a first user of a social-networking system. In the example of FIG. 4, each user-card 430A-C corresponds to a structured query of the social graph 200. Each user-card 430A-C may include one or more references 440 to one or more second users who correspond to one or more node that match the structured query. As an example and not by way of limitation, user-card 430A may correspond to a structured query for users who have made a friend request to the first user. In particular embodiments, the references 440 to one or more second users may comprise a profile image, name, e-mail address and other contact information, a user ID, or other information relating to the second user's profile in the social-networking system 160. User-card 430A displays a natural-language title for the particular structured query, such as in the example of FIG. 4, "Friend Requests", and displays at least one reference 440 to a second user corresponding to that particular graph query. The first user may then interact with the user-card 430A to view more references to second users corresponding to the user-card, or interact directly with the references 440 or interactive elements 442 that are displayed for each second user. In the example of FIG. 4, user-card 430B corresponds to a structured query for users with a birthday matching the current date. In particular embodiments, selecting a user-card 430A may present the user with a new interface for accessing additional content associated with user-card 430A. In particular embodiments, selecting the user-card 430A may simply expand the display of user-card 430A within the example user-card interface 410. As an example and not by way of limitation, user-cards 430A-C may include: People You May Know; Friend Requests; Friends with Birthday Today; Life Events or Recent Moments; Friends with Upcoming Birthdays; Local Check-Ins; Check-Ins Near [a particular location]; People Traveling Now; People You've Contacted; Name Days; Anniversaries (e.g. work, personal, etc.); People Visiting from Out of Town; People Visiting [a particular city]; Local People in [city the first user is visiting]; People from Where You Are (e.g. people whose hometown the first user is currently in); People Currently At the Same Event As You; People Going to the Same Event in the Future; Who is Hungry (and Nearby); Who's Watching What You Are; Who's Playing What You're Playing; Who's at the Game (e.g. who is also attending the same sporting event as the first user); People with Relationship Changes/Break-Ups; List of Favorites (e.g. people the first user has marked as favorites); People Travelling to the Same Place as You in the Future (e.g. if a second user will be in New York City at the same time in the future as the first user); Upcoming Graduations; Graduations Today; Friendversaries (e.g. the anniversary of the date that a first user became friends with a second user on the social-networking system); Work Updates (e.g. changes to job titles); People Who Just Moved To Your Hometown; People Who Just Checked Into [a location marked by the first user as a favorite]; People Who Just Learned Your Language (or other skill shared with the first user); People You've Just Met/Friended; and etc.

In particular embodiments, the first user may navigate through user-cards 430A-C using a touch input detected by touch sensor of mobile client system 130. As an example and not by way of limitation, the user may navigate between user-cards 430A-C by swiping upward or pulling down on the title bar or edge of 430A-C depending on how user-cards 430A-C are displayed on mobile client system 130. In particular embodiments, the user may navigate between user-cards 430A-C by swiping left or right on the touch sensor of mobile client system 130. In particular embodiments, the user-card interface 410 may only display one user-card at a time, and the first user may navigate from each user-card to user-card through a swipe gesture. In particular embodiments, a plurality of user-cards may be displayed simultaneously on the user-card interface 410. Although this disclosure describes navigating through the cards using particular touch gestures, this disclosure contemplates navigation of the cards through any suitable user input, such as for example, actuating a button.

In particular embodiments, user-cards 430A-C may correspond to a large number of second users 440, such that displaying all of the users within each user-card would be infeasible. In the example of FIG. 4, each user-card 430A-C as displayed in user-card interface 410 may only list one or several users corresponding to the user-card. In particular embodiments, the first user may then interact with user-card 430A-C, which will cause the selected user-card 430A-C to expand on the user-card interface 410. The user-card 430A-C may display a greater number of users than it displayed prior to the interaction. In particular embodiments, the first user may then scroll through the list of users displayed within user-card 440.

In particular embodiments, user-cards 430A-C may also contain interactive elements 442. As an example and not by way of limitation, interactive element 442 may be a like button; a button accepting or denying a friend request; a button to block someone or remove them as a friend; a prompt to write a message on another user's wall; a prompt to send another user a message; and other various ways to interact with another user through a social-networking system. In particular embodiments, different user-cards 430A-C may display fewer interactive elements than the full range of available interactive elements, due to space limitations in the user-card interface 410. In particular embodiments, each user-card 430A-C may display one or two interactive elements, which are determined to be the most appropriate for that user-card. In the example of FIG. 4, user-card 430A contains other users who have friend-requested the first user. User-card 430A then displays two interactive elements 442, to either confirm the friend request or to deny the friend request. In the example of FIG. 4, user-card 430B contains other users whose birthday is the current date. User-card 430B then displays an interactive element 442 which enables the first user to post a message on the other users' walls. In particular embodiments, determination of which interactive elements will be displayed on a particular user-card may be performed by the social-networking system by usage history for that user-card. In particular embodiments, the first user may indicate a preference for what interactive elements he or she would like to be displayed for particular user-cards in user-card interface 410.

In particular embodiments, social-networking system 160 may calculate a user-card score for the suggested queries for each user-card. In particular embodiments, the user-card score may be used to determine if the user-card should be sent to the first user for display. In particular embodiments, the user-card score may be used to order the user-cards for display to the first user. As an example and not by way of limitation, the user-cards may be ordered as a ranked list based on the user-card scores. The user-card score may be, for example, a confidence score, a probability, a quality, a ranking, another suitable type of score, or any combination thereof. The structured queries may be scored based on a variety of factors, such as, for example, the page or type of page the user is accessing, user-engagement factors, business-intelligence data, the predicted click-through rate (CTR) of particular suggested queries, the conversion-rate of particular suggested queries, user-preferences of the user, the search history of the user, advertising sponsorship of particular queries, the user's social-graph affinity for social-graph elements referenced in particular queries, the inferred intent of the user, the general or current popularity of particular suggested queries, the usefulness of particular suggested queries, the current geographic location of the user, the current time, other suitable factors, or any combination thereof. Although this disclosure describes scoring user-cards and structured queries in a particular manner, this disclosure contemplates scoring structured queries in any suitable manner. In particular embodiments, social-networking system 160 may determine user-card scores for a first user dynamically based on a change in the factors described above. As an example and not by way of limitation, if user-card scores for a first user are calculated at a first geographic location at a first time, and then at a second time the first user moves to a second geographic location, the user-card scores may be re-calculated for the new time and new location. In particular embodiments, the re-calculation of user-card scores may occur with no input from the first user.

As described above, user-cards 430A-C corresponding to structured queries may be displayed on a user-card interface 410 of a native application or on a webpage accessed by a browser client on the user's client system 130. In particular embodiments, the user-card interface 410 may display only user-cards 430A-C previously selected manually by the user of the mobile client system 130. Furthermore, in particular embodiments, user-cards 430A-C corresponding to structured queries having a user-card score above a threshold user-card score may be sent or displayed to the user. The user-cards 430A-C may be ordered or ranked by their user-card scores. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

In particular embodiments, ranking of user-cards 430A-C may be based at least in part on particular query-domains, query-filters, filter values, or any combination thereof. Herein, reference to a predicted CTR ranking may refer to a probability that the user will "click through" to interact with an entity or a user associated with the content of a particular user-card 430A-C. As an example and not by way of limitation, social-networking system 160 may rank cards 430A-C using a value model described below. As another example and not by way of limitation, social-networking system 160 may score user-cards 430A-C according to inferring a use case associated with user-card 430A-C, as described below. Although this disclosure describes ranking user-cards in one or more particular manners, this disclosure contemplates in any suitable manner.

In particular embodiments, social-networking system 160 may score cards 430A-C based at least in part on a value model. As an example and not by way of limitation, the value model of ranking may calculate an overall value to social-networking system 160. For example, an activity (e.g. liking a wall post) may have a CTR of 10% and may have an associated value of 1 and another activity (e.g. accepting a friend request) may have a CTR of 5% but a value of 100 since accepting a new friend request may be determined to make users 100 times happier to do this than like a post. Therefore, user-cards relating to friend requests may be ranked higher than user-cards only relating to wall posts. In particular embodiments, the value model may be a function of the predicted CTR multiplied by a predicted conversion rate and multiplied by a value of the conversion event.

As another example, the value model of scoring may be based at least in part on social-networking system 160 calculating the predicted CTR for each user-card 430A-C. Social-networking system 160 may infer user-cards 430A-C corresponding to suggested queries with higher predicted CTRs are of higher interest to the user. For example, social-networking system 160 may calculate the predicted CTR based at least in part on factors, such as for example time of day, day of the week, current location of the user, CTRs of other users with similar demographic data, a calculated CTR for the user with respect to particular query-domains/query-filters, social-graph affinity, or any combination thereof. In particular embodiments, social-networking system 160 may calculate the predicted CTR for each user-card 430A-C based at least in part on preferences of the user. As an example and not by way of limitation, one of more user-preferences may be specified by the user, other users (e.g., parents or employers of the user), system administrators, third-party systems 170, or otherwise determined by social-networking system 160. More information on calculating predicted CTR for a user-card may be found in U.S. Patent Application No. 61/918,431, filed 19 Dec. 2013, which is incorporated by reference.

In particular embodiments, social-networking system 160 may order user-cards 430A-C based at least in part on inferring a use case associated with each user-card 430A-C. Furthermore, inferring the use case of the user may be based at least in part on the user history of the user or other users with similar demographic information as the user. In particular embodiments, the inferred intent(s) of the user may correspond to particular suggested queries or query-domain/filters, and user-cards 430A-C corresponding to suggested queries matching the inferred intent of the user may have a higher ranking. In particular embodiments, social-networking system 160 may infer the intent of the user based on a variety of factors, such as for example, the time of day, the proximity of the user to other users or objects, social-graph information, social-graph affinity, the search history of the user, feedback from the user, the geographic location of the user, other relevant information about the user, or any combination thereof. As an example and not by way of limitation, social-networking system 160 may infer the user is interested in finding a restaurant based on the time of day and information, such as for example user-history, of the user. For example, social-networking system 160 may rank user-cards 430A-C referencing restaurants more highly at a particular time frame based at least in part on the user frequently checking-in at restaurants at the particular time of day. As another example, social-networking system 160 may rank particular user-cards 430A-C more highly based on the particular day of the week and information, such as for example user-history, of the user. For example, social-networking system 160 may rank user-cards 430A-C referencing ["Movies"] (e.g. "People Watching Movies Right Now") more highly on a particular day of the week (e.g. Friday) based at least in part on the user history (e.g. "check-ins") with respect to movie theaters on the particular day of the week. More information on determining the intent of a user may be found in U.S. patent application Ser. No. 13/776,469, filed 25 Feb. 2013, which is incorporated by reference. Although this disclosure describes inferring the intent of a user in a particular manner, this disclosure contemplates inferring the intent of the user in any suitable manner.

In particular embodiments, social-networking system 160 may score user-cards for the first user that will have a future relevance for the first user. As an example and not by way of limitation, social-networking system 160 may receive information relating to the first user travelling to Boston, Mass., in three weeks. User-cards relating to Boston may not be immediately relevant to the first user. As the trip to Boston nears, user-cards relating to Boston, such as "People You May Know in Boston", "People From Boston" (i.e. people with Boston as their hometown), "People Travelling to Boston At the Same Time as You", etc. may have increased user-card scores even before the first user departs for Boston, so that they may find out about second users associated with Boston before departure instead of only learning about these users once the first user is in Boston. In this way, the first user could plan to meet with second users in Boston, or ask users about visiting Boston ahead of time.

In particular embodiments, the second users comprising each user-card 430A-C may also be scored and ordered for presentation. In particular embodiments, ordering of the second users referenced in each user-card 430A-C may take the form of a ranked list. In particular embodiments, a user-card 430A-C may contain more references 440 to second users than can be effectively displayed in the user-card interface 410. This may be due to the size of the display area 400 of mobile client system 130, or due to the limited size of each user-card 430A-C in user-card interface 410. In particular embodiments, each second user referenced in a particular user-card 430A-C may be associated with a user-score. The user-score may be an indication of how relevant having that particular second user in that particular user-card will be to the first user. In particular embodiments, the user-score may be based at least in part on the social-graph affinity of the first user with respect to the second user. In particular embodiments, the user-score may be calculated using the affinity coefficient of the first user with respect to the second user. In particular embodiments, the user-score may be calculated based on the affinity coefficient of a node corresponding to the structured query of the user-card 430A-C with respect to the second user.

In particular embodiments, only second users who are above a threshold user-score for the particular user-card 430A-C may be referenced within a user-card. In particular embodiments, the references 440 for the second users in user-card 430A-C may be further ranked based on the user-scores of each second user for the particular user-card 430A-C. As an example and not by way of limitation, for a user-card 430A-C that is displayed on user-card interface 410 with the capability of displaying two sets of references 440 to two second users, the social-networking system 160 may calculate user-scores for all second users referenced by user-card 430A-C, and choose the two second users with the highest user-score for the particular user-card. The references 440 for the chosen two second users would be displayed in user-card 430A-C, with the reference 440 for the higher-scoring second user being listed first. If the first user then interacts with user-card 430A-C, the user-card may show an expanded list of references 440 to second users, with the reference 440 to the second user with the third-highest user-score listed below the references 440 for the first two second users.

Figure 5:
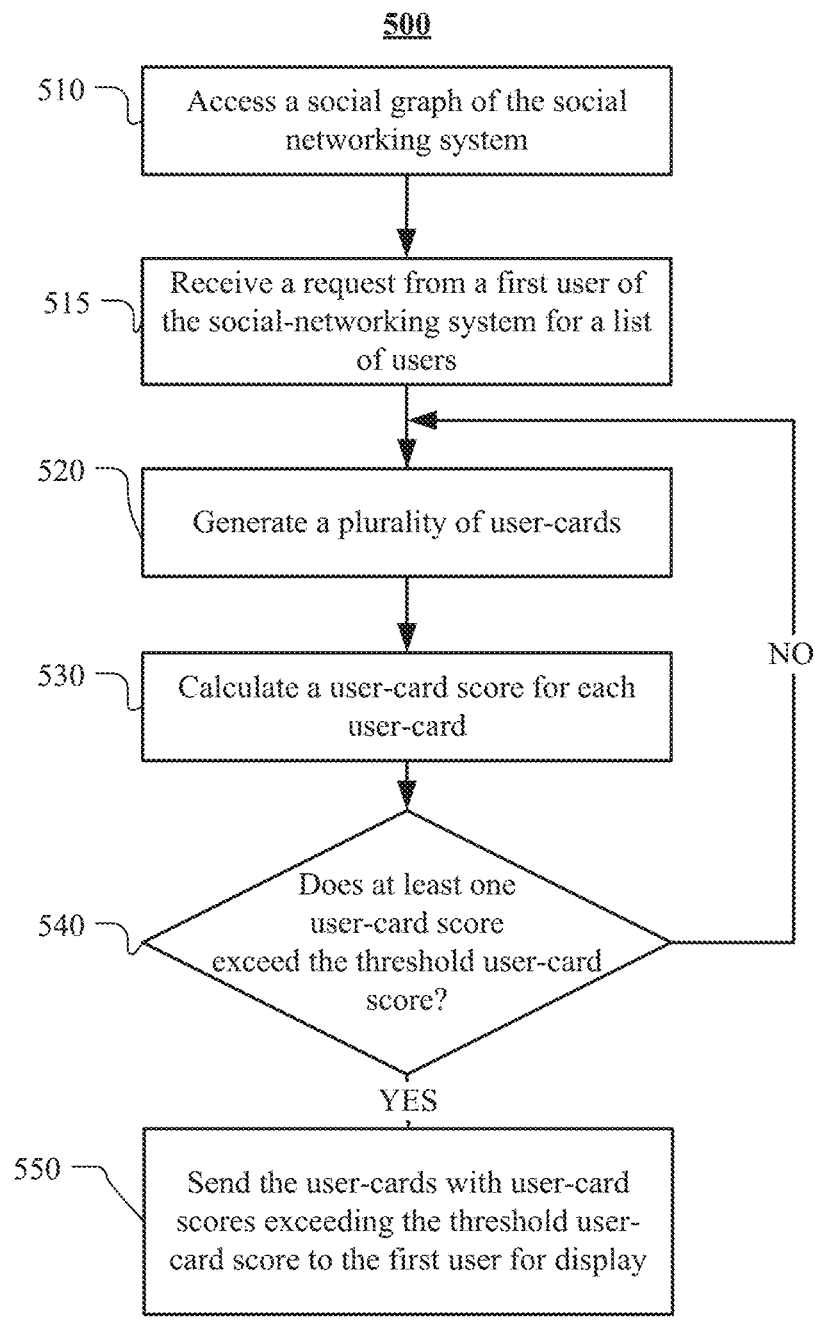
FIG. 5 illustrates an example method for generating user-cards.

FIG. 5 illustrates an example method 500 for generating user-cards for a first user of mobile client system 130. The method may begin at step 510, where social-networking system 160 may access a social graph 200 comprising a plurality of nodes and a plurality of edges 206 connecting the nodes. The nodes may comprise a first user node 202 and a plurality of second nodes (one or more user nodes 202, concepts nodes 204, or any combination thereof). At step 515, social-networking system 160 may receive a request from a first user of the social-networking system 160 for a list of users. In particular embodiments, the request in step 515 may be an express request to view user-cards. In particular embodiments, social-networking system 160 may interpret a first user's request as a request for user-cards. At step 520, social-networking system 160 may generate a plurality of user-cards. The user-cards may be generated based on contemporaneous input of the first user, past inputs of the first user, or generated automatically by the social-networking system based on associations of the first user with particular nodes and edges of the social graph. In particular embodiments, each user-card may include a structured query that references a query-domain associated with the online social network and zero or more query-filters. Each query-filter may reference one or more nodes of the plurality of nodes or one or more edges of the plurality of edges. At step 530, social-networking system 160 may calculate a user-card score for each user-card based on one or more user-card factors. At step 540, social-networking system 160 may determine if the user-card score for each user-card exceeds a threshold user-card score. At step 550, social-networking system 160 may send each user-card having a user-card score greater than a user-card threshold score to the first user for display on a page currently accessed by the first user.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for generating cards for the user including the particular steps of the method of FIG. 5, this disclosure contemplates any suitable method for generating cards for the user including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
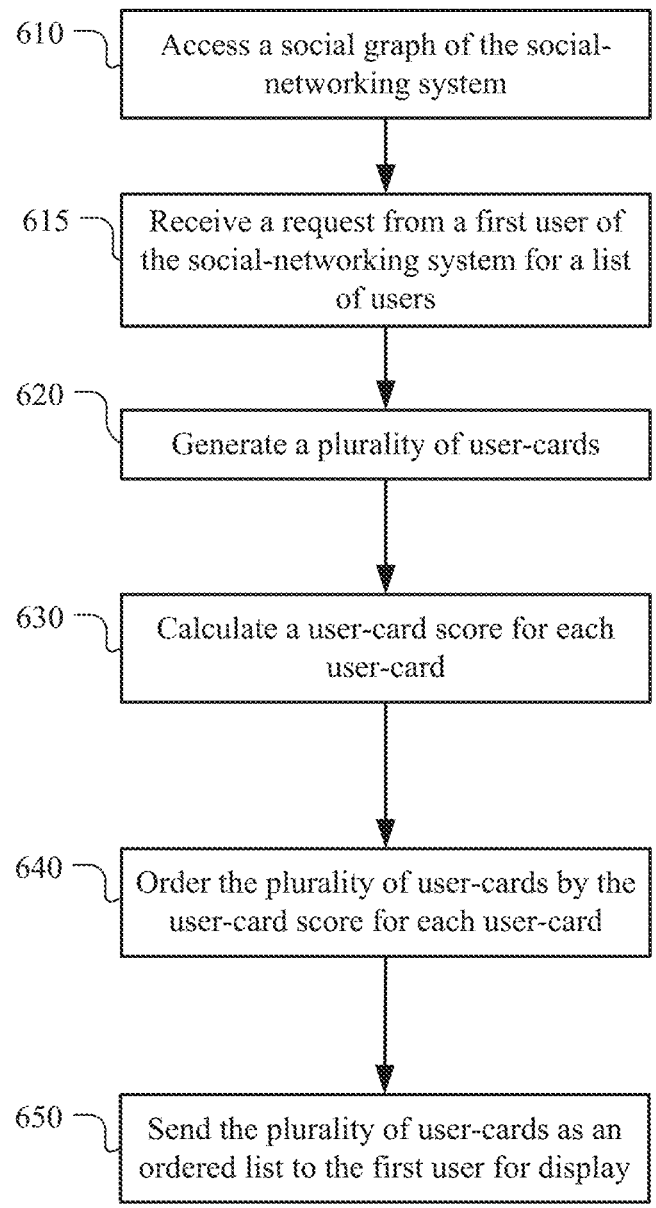
FIG. 6 illustrates an example method for ranking user-cards.

FIG. 6 illustrates an example method 600 for ordering user-cards based on a user-card score. The method may begin at step 610, where social-networking system 160 may access a social graph 200 comprising a plurality of nodes and a plurality of edges 206 connecting the nodes. The nodes may comprise a first user node 202 and a plurality of second nodes (one or more user nodes 202, concept nodes 204, or any combination thereof). At step 615, social-networking system 160 may receive a request from a first user of the online social network for a list of users. In particular embodiments, the request in step 515 may be an express request to view user-cards. In particular embodiments, social-networking system 160 may interpret a first user's request as a request for user-cards. At step 620, social-networking system 160 may generate a user-card group that includes a number of user-cards. In particular embodiments, each user-card corresponds to a suggested query that references a query-domain associated with the online social network and zero or more query-filters. In particular embodiments, each query-filter references one or more nodes or one or more edges. At step 630, social-networking system 160 may calculate a predicted user-card score for each user-card in the user-card group based on one or more user-relevance factors. At step 640, social-networking system 160 may rank each of the user-cards in the user-card group based on the predicted user-card score. At step 650, social-networking system 160 may send the user-card group to the first user for display on a page currently accessed by the first user. In particular embodiments, the user-cards of the user-card group may be ordered based on the ranking associated with the user-cards.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for ranking cards including the particular steps of the method of FIG. 6, this disclosure contemplates any suitable method for ranking cards including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
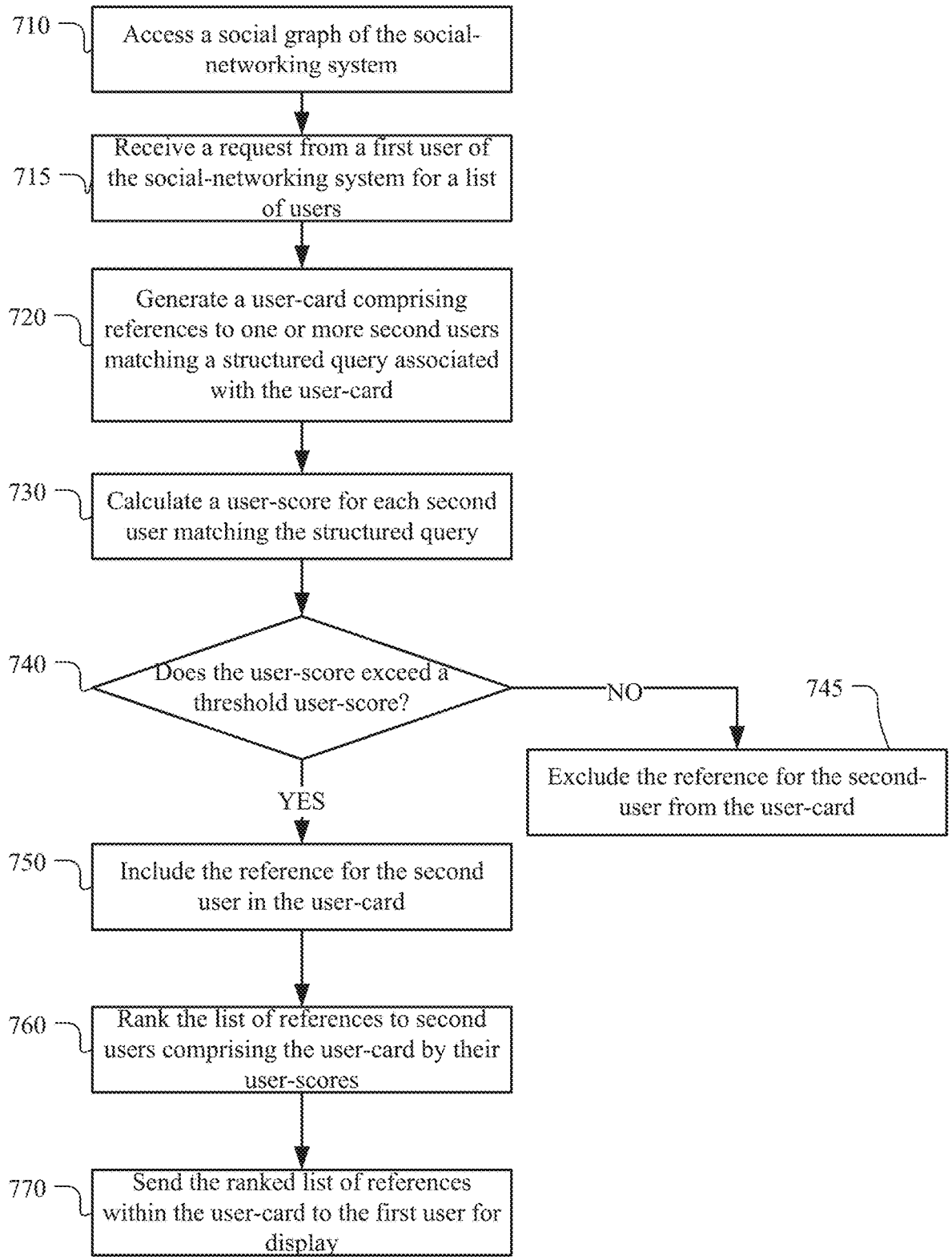
FIG. 7 illustrates an example method for ranking users in a user-card.

FIG. 7 illustrates an example method 700 for determining one or more second users to be referenced in a particular user-card, and for ordering references 440 to one or more second users. In particular embodiments, ordering of references 440 may comprise a ranked list of references to each second user. The method may begin at step 710, where social-networking system 160 may access a social graph 200 comprising a plurality of nodes and a plurality of edges 206 connecting the nodes. The nodes may comprise a first user node 202 and a plurality of second nodes (one or more user nodes 202, concept nodes 204, or any combination thereof). At step 715, social-networking system 160 may receive a request from a first user of the social-networking system 160 for a list of users. In particular embodiments, the request in step 515 may be an express request to view user-cards. In particular embodiments, social-networking system 160 may interpret a first user's request as a request for user-cards. At step 720, social-networking system 160 may generate a list of references to one or more second users corresponding to the structured query for a user-card. In particular embodiments, the list of one or more second users may include second users who are not associated with a user node 202 on the social graph 200, but are contacts of the first user outside of the social graph. As an example and not by way of limitation, second users may be users who call or are called by the first user via telephonic capabilities of mobile client system 130; send messages and emails through the mobile client system 130 through third-party applications and web browser interfaces; or have been recorded by third-party applications or by the mobile client system 130 as having been in close geographic proximity to the first user. At step 730, social-networking system 160 may calculate a user-score for each of the one or more second users of the list generated in step 720. In particular embodiments, the user-score may be calculated based on the social-graph affinity for the first user with respect to a particular second user. In particular embodiments, the user-score may be calculated based on an affinity of the second user for the one or more nodes referenced in the structured query corresponding to the user-card. In particular embodiments, the user-score may be calculated based on how well a particular second user matches the structured query of the user-card. Additional bases for calculating a user-score may be used. As an example and not by way of limitation, user-scores may be calculated based on social interactions of the first user and second user through the social-networking system or through other means of social interaction (e.g. phone calls, emails, person-to-person interactions, etc.). This allows users not maintaining a presence on the social-networking system 160 to be scored. In particular embodiments, social-networking system 160 may generate a composite user-score by weighting the user-score components based on the social graph 200 by a weighting factor and combine it with a user-score component based on social activities not on the social graph 200 which is weighted by another weighting factor. At step 740, social-networking system 160 may determine if each second user has a user-score exceeding a threshold user-score for the particular user-card 430A-C. At step 750, social-networking system 160 may generate a list of references 440 to second users comprising the user-card having user-scores that exceed the threshold user-score. At step 760, social-networking system 160 may rank the one or more references 440 to second users by their user-scores, and only include the top-ranked references 440 in user-card 430A-C. As an example and not by way of limitation, social-networking system 160 may only include the references 440 for the ten second users with the highest user-scores in user-card 430C. At step 770, social-networking system 160 may send the list of references 440 of the second users to the first user for display within the particular user-card 430A-C. In particular embodiments, the list of references 440 sent to the first user may be sent as a ranked list based on the user-scores of the second users.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for ranking cards including the particular steps of the method of FIG. 7, this disclosure contemplates any suitable method for ranking cards including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
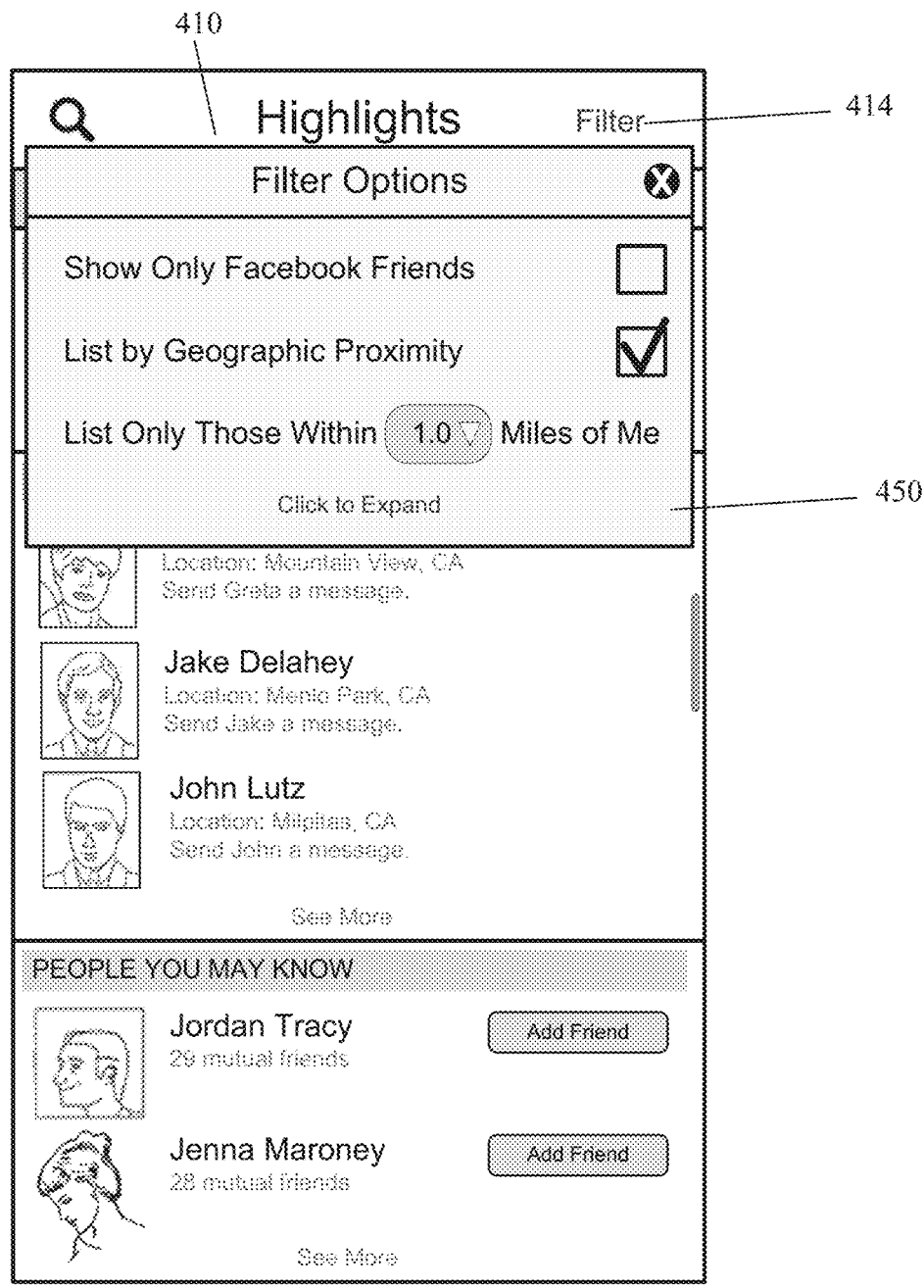
FIG. 8 illustrates an example query-filter for a user-card interface.

FIG. 8 illustrates an example of focused queries in user-card interface 410. The social-networking system 160 may determine one or more query-filters that are applicable to user-card 430A-C, based on the original structured query associated with user-card 430A-C and the corresponding nodes in the social graph 200. In particular embodiments, the first user may select an interactive element 414 that will display a plurality of filter options to the first user. In particular embodiments, the user-card interface 410 may display default query-filters 450 to the first user based on the currently displayed one or more user-cards 430A-C. In particular embodiments, the first user may select in advance one or more query filters that he or she wishes to see in user-card interface 410. In particular embodiments, the first user may add query-filters through a text query. The social-networking system 160 then translates the text query input by the first user into a new structured query. In particular embodiments, social-networking system 160 may determine one or more other nodes that are not referenced in the original structured query of user-card 430A-C, and generate a query-filter 450 that includes references to those other nodes of the social graph 200. In particular embodiments, the query-filter may then generate a new user-card 430A-C that includes references to those other nodes of social graph 200 as well as the nodes associated in the original structured query. As an example and not by way of limitation, in FIG. 4, user-card 430B lists second users having a birthday that matches the current date. A first user may select a query-filter based on geographic location. User-card 430B may be updated to read "Birthdays Today in Palo Alto, Calif." The second users comprising user-card 430B will be updated with the new query. In particular embodiments, the user-card score and the user-score for the user-card 430A-C and the one or more second users comprising the user-card 430A-C may be re-calculated following the example methods illustrated in FIG. 6 and FIG. 7, and the user-card interface 410 may be updated to display the user-cards 430A-C and second users 440 as ranked using the re-calculated scores.

In particular embodiments, in response to a query-filter being applied to one user-card 430A-C, social-networking system 160 may apply the same query-filter to other user-cards 430A-C. As an example and not by way of limitation, social-networking system 160 may determine that the first user is interested in the query-filter that she has applied, and that she would prefer to see other user-cards with the same query-filter, without having to apply the query-filter separately for each user-card 430A-C.

Figure 9:
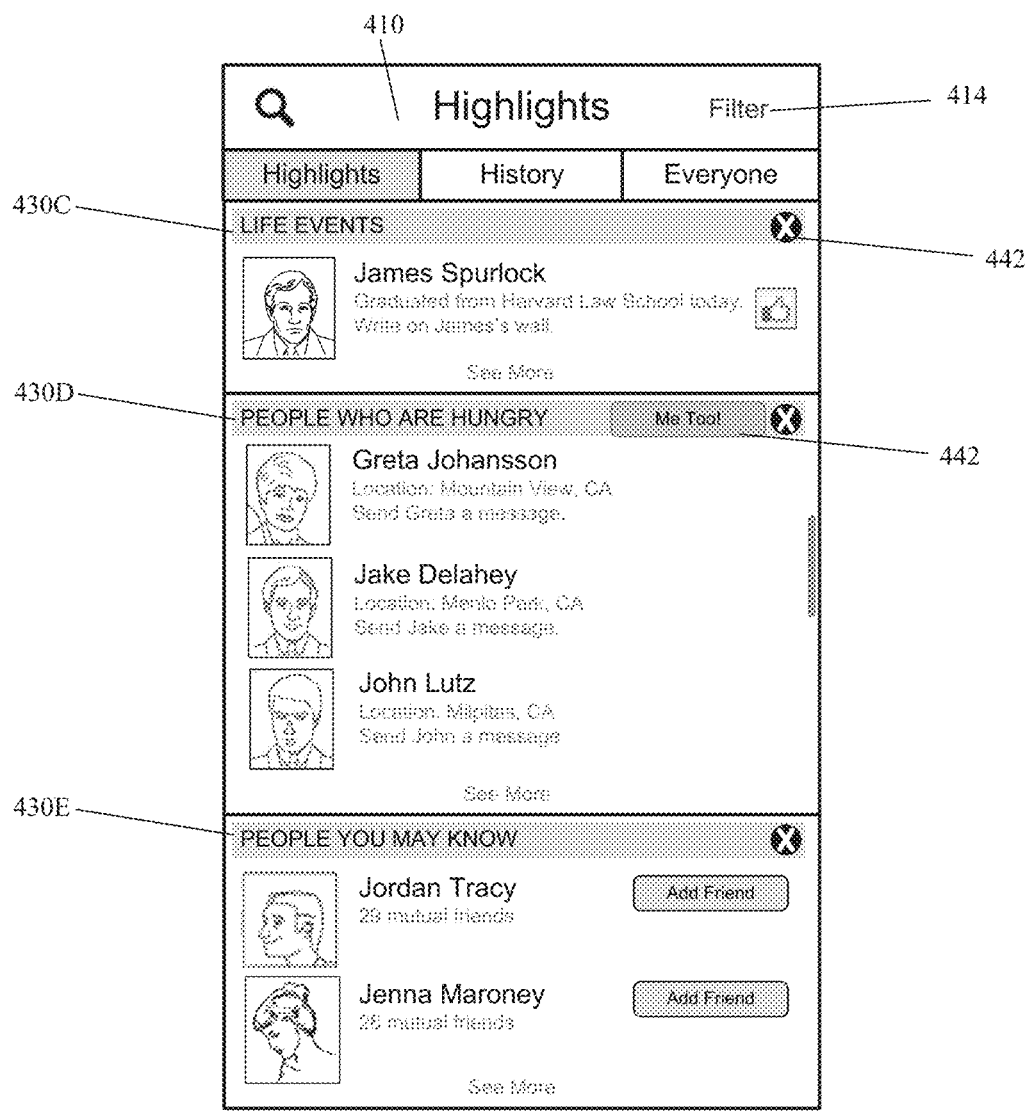
FIG. 9 illustrates an example user-card interface with different interaction options for each user-card.

FIG. 9 illustrates an example of different user-interactions being made available to the user for each user-card 430C-E. In the example of FIG. 9, for user-card 430C ("Life Events"), the users being displayed in the user-card may have had some recent life experience of some personal importance. In particular embodiments, the user of mobile client system 130 may be presented with options to "Like" the new life event, and further may be able to write to that user's wall. Further in the example of FIG. 9, user-card 430D ("People Who Are Hungry") may display references to second users who correspond to a structured query for "hunger." As an example and not by way of limitation, social-networking system 160 may use the inferred intent of one or more second users to determine if they are hungry and should be placed in user-card 430D. In particular embodiments, the user may then contact one or more second users referenced in user-card 430D, for example to see if they would like to meet up for a meal. In the example of FIG. 9, user-card 430E ("People You May Know") may list references to second users of social-networking system 160 who are not "friends" of the first user, but are users whom the social-networking system 160 believes may know the first user. The second users referenced in user-card 430E could be, as an example and not by way of limitation, friends of friends of the first user, classmates or work colleagues of the first user, or may be present at the same events and locations as the first user at the same time. The first user may be presented with the option to friend request the referenced second users in user-card 430E.

In particular embodiments, the first user may have the option of indicating that they too have an affinity for a particular user-card. In the example of FIG. 9, the first user may see user-card 430D which shows second users who are hungry as recorded by social-networking system 160. The first user may select an interactive element 442 which is labeled "me too," allowing the first user to indicate to social-networking system 160 that he too is hungry. This may enable the first user to be associated with the concept node for hunger without reference to any other actions of the first user which may indicate an association with hunger. In particular embodiments, this may add the first user to the list of users that are viewable by other users also viewing a similar user-card to user-card 430D. As an example and not by way of limitation, while the first user is viewing user-card 430D, a third user may also be viewing a similar user-card which contains the same list of second users as user-card 430D, but does not contain the first user in the list. Then, if the first user selects the "Me Too" button for user-card 430D, then the user-card viewed by the third user may be updated to include the first user in the list of second users. The third user may then contact the first user to arrange a meal together.

In particular embodiments, selecting an interactive element 442 indicating a "Me Too" status for a particular user-card may also affect the user-card score for that particular user-card. In particular embodiments, the user-card score may be based at least in part on the affinity of the first user with respect to the nodes 202, 204 and edges 206 referenced in the structured query for the user-card 430A-C. By selecting the "Me Too" button, the first user may increase his affinity with respect to the referenced nodes and edges, and thereby increase the user-card score for the particular user-card. In particular embodiments, all of the user-cards 430A-C displayed in user-card interface 410 may be updated with new user-card scores based on the new associations between the first user and the social graph based on the selection of the "Me Too" button. As an example and not by way of limitation, a first user may have on her user-card interface 410 two user-cards for "Watching a Movie Right Now," and "Jogging Right Now." If the first user selects the "Me Too" button for "Jogging Right Now," the user-card score of that user-card may increase, while the user-card score for "Watching a Movie Right Now" user-card may decrease, since the first user is likely more interested in other users who are jogging at the same time as her, and less interested in other users who are most likely not jogging at that time.

In particular embodiments, the selection of a "Me Too" button for a particular user-card may also affect the user-score for one or more second users with respect to the first user. In particular embodiments, in response to the selection of a "Me Too" button, social-networking system 160 may re-calculate user-scores for one or more second users in that same user-card. As an example and not by way of limitation, a first user may be presented with a user-card 430D indicating "People Who Are Hungry." The current ranking of second users in user-card 430D may be based on a user-score that weights the social affinity of each second user to the first user as a higher factor than geographic proximity of the second user to the first user. In that case, user-card 430D may display at the top of the user-card second users who are hungry, and closer friends to the first user. However, once the first user selects the "Me Too" button for user-card 430D, the calculation of user-scores for user-card 430D may be changed. It may be more important for the first user to know who else is hungry around him, rather than which of his closest friends are also hungry. Therefore, user-scores for second users in user-card 430D may be recalculated with a greater user-score weight being given to geographic proximity. The first user may then see an updated user-card 430D after his selection of the "Me Too" button, where the second users displayed at the top of user-card 430D are the hungry people close to him. In particular embodiments, selection of the "Me Too" button may result in re-calculation of user-scores in other user-cards 430A-C in addition to the selected user-card.

Figure 10:
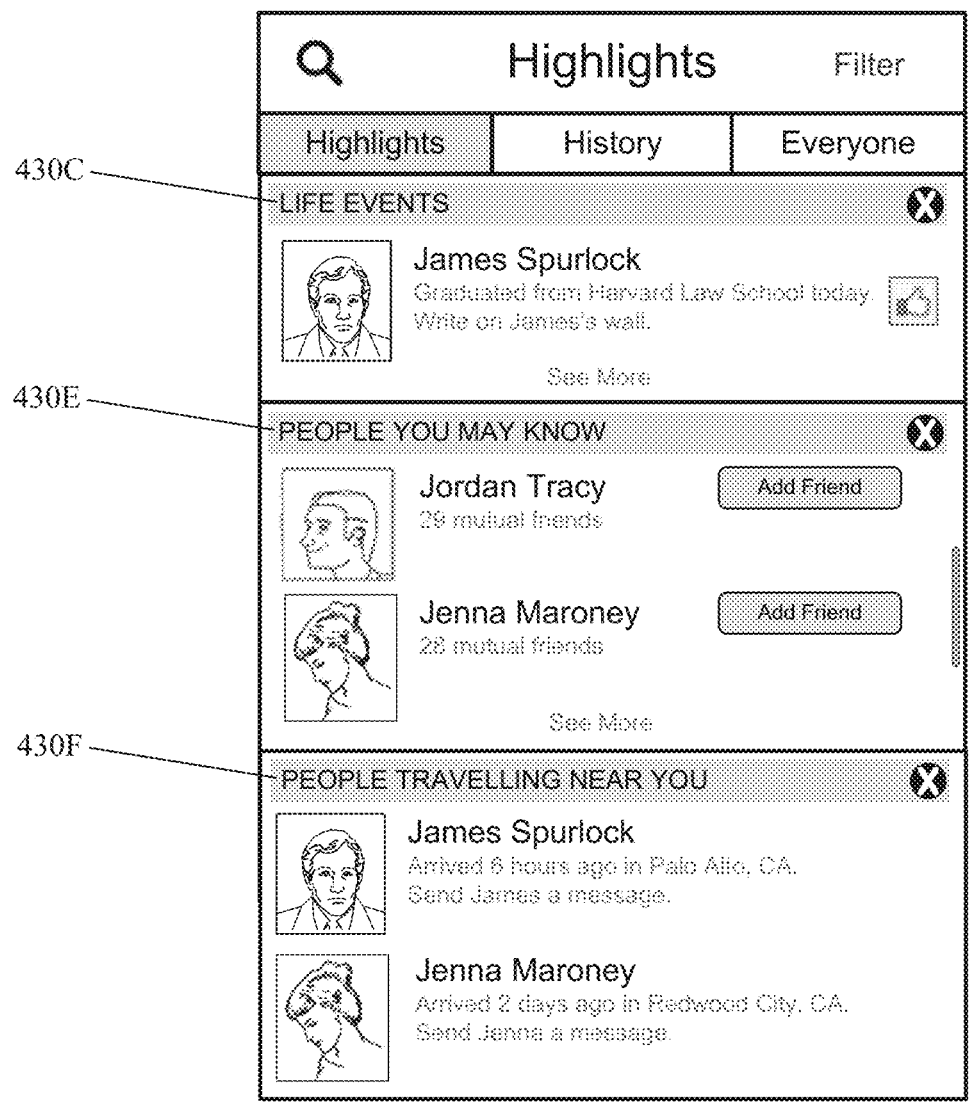
FIG. 10 illustrates an example user-card interface with a user-card removed.

In particular embodiments, the first user may also have the option to delete particular user-cards from the user-card interface 410. In the example of FIG. 9, each user-card 430C-E displays an interactive element 442 represented as an "X" button in the upper-right corner. If the user wishes to remove a particular user-card from the user-card interface 410 (for example if the user is never interested in seeing who is hungry at the moment), the user may select the "X" button to remove the user-card from display, as shown in FIG. 10. In the example of FIG. 10, user-card 430D has been removed from user-card interface 410, and user-card 430E has been moved up in the view of user-card interface 410 to be directly below user-card 430C. A new user-card 430F ("People Travelling Near You") is now present on the display of user-card interface 410.

In particular embodiments, social-networking system 160 may use the first user's interactions with user-cards 430A-C to improve dynamic generation of user-cards for display to the first user. As an example and not by way of limitation, each time that the first user interacts with a user-card 430A-C, the user-card score for that user-card may be increased, so that the user-cards that the first user interacts with more frequently will appear at the top of the list of user-cards. As another example, a first user may only view a particular user-card at certain times, certain geographic locations, or when social-networking system 160 detects that he is with a certain other person. Social-networking system 160 may then increase the user-card score for that user-card when those conditions are met, so that the next time the user views user-card interface 410 under the same conditions, the same user-card is displayed higher on the user-card interface 410 than it is displayed when those conditions are not met. In particular embodiments, a first user may consistently apply a particular query-filter for a user-card. Social-networking system 160 may eventually decide to display a user-card to the first user already having the query-filter, instead of the original user-card. As an example and not by way of limitation, a first user may frequently interact with a user-card for "Jogging Right Now," and always apply an additional filter for "Show Only Facebook Friends." Social-networking system 160 may eventually replace the "Jogging Right Now" user-card with a "Facebook Friends Jogging Right Now" user-card for display on user-card interface 410, saving the first user the time of applying the same query-filter once again. The first user may be asked if she would like to make the change permanent, or the user-card interface 410 may update the user-card automatically.

Implicit Contacts

In particular embodiments, social-networking system 160 may generate, for a first user, a user-list comprised of all second users that may be referenced in user-cards of the first user. Limiting user-cards to contain only second users who are in the user-list may be helpful, as the second users on the user-list may be the second users that the social-networking system 160 determines the first user knows or should know. This ensures that when the first user is browsing user-cards, the first user will only see second users that the first user actually knows, and thus the first user may be more interested in seeing those second users rather than other users that social-networking system 160 has determined is not known to the first user. As an example and not by way of limitation, social-networking system 160 may maintain a user-list for each first user; then, when social-networking system 160 receives a request from the first user to view user-cards, it may generate user-cards and determine second users to fill each user-card using only the second users listed in the user-list, instead of determining user-scores for any additional users. In particular embodiments, a user-list may be comprised of the first user's friends on social-networking system 160; friends-of-friends of the first user (e.g. indirect connections to the first user); and users who have interacted with the first user through third-party APIs on social-networking system 160 (as an example, a second user who is not friends with the first user on the social-networking system, but has played a social game together through the social-networking system). In particular embodiments, social-networking system 160 may add second users who have been invited to the same events as the first user, or have attended the same events as the first user. In particular embodiments, social-networking system 160 may add second users who have interacted with the first user using third-party applications. As an example and not by way of limitation, social-networking system 160 may add second users who have interacted with the first user through applications like Twitter, Instagram, or Skype. In particular embodiments, social-networking system 160 may receive information about second users from the first user's mobile client system 130. As an example and not by way of limitation, the social-networking system 160 may gain access to an address book of the first user. This would allow social-networking system 160 to add to the user-list second users who are contacts of the first user outside of the social-networking system. The social-networking system 160 may add second users who have called the first user or been called by the first user; second users who have sent or received e-mail, short message service (SMS), or instant messaging (IM) messages; and second users who are listed in address books associated with the first user. As an example and not by way of limitation, second users listed on a first user's phone book, Gmail address book, or Outlook address book may be added to a user-list. In particular embodiments, social-networking system 160 may receive information relating to location data for the first user at particular points in time, and add second users who have frequently been at the same geographic location at the same time as the first user. In particular embodiments, for a second user who is a user of social-networking system 160, interactions between the first user and the second user described above may be represented in social graph 200 between a user node 202 associated with the first user, and another user node 202 associated with the second user. In particular embodiments, where a second user is not a user of social-networking system 160, social-networking system 160 may generate a new node in social graph 200 (e.g., a user node 202 or a concept node 204) to represent the second user. The social-networking system 160 may then represent interactions between the first user and the second user in a similar manner described above for a second user who is a user of social-networking system 160.

In particular embodiments, social-networking system 160 may use information associating the first user with the second user (or vice versa) which is known to social-networking system 160, but is not visible to the first user, the second user, or both. This may be due to privacy settings of the first user or the second user which prevents the association information from being sent to the other user. As an example and not by way of limitation, a first user may have indicated on her profile page on the social-networking system 160 that she works at the Strand Book Store. A particular second user, who has a profile page on social-networking system 160 but is not a friend of the first user on social-networking system 160, may have posted on his wall that he frequently goes to the Strand Book Store. The second user may have set his privacy settings so that the first user is not able to view his profile. Social-networking system 160 may still be able to use these two pieces of data in calculating a contact-score, determine that the contact-score exceeds the threshold contact-score, indicating that the first user likely knows the second user, and add the second user to the first user's user-list. The first user may indeed know the second user because they have interacted at the book store; however, the first user may still not be able to view the second user's post about going to the book store. As another example and not by way of limitation, the affinity of a first user with respect to a second user may be defined as the presence of the second user in the first user's list of contacts. Then, if the first user searched for the second user in the social-networking system, the second user may be placed in the user-list of the first user. However, the second user would not be notified that he or she has been placed in the user-list of the first user, and would not have access to information regarding the action that caused the second user to be placed on the first user's user-list (e.g. the first user's action of searching for the second user). In particular embodiments, a second user would not be able to directly influence the user-list of the first user, unless the second user altered their own profile information; e.g. changed their name or deactivated their account. More information about using privacy settings to determine visibility of interactions to another user may be found in U.S. patent application Ser. No. 13/556, 017, filed 23 Jul. 2012, which is incorporated by reference.

In particular embodiments, social-networking system 160 may calculate contact-scores for each second user with respect to the first user. The contact-score may be based on a calculated social-graph affinity of the first user with respect to the second user. In particular embodiments, other interactions between the first user and the second user that may occur through the social-networking system or through other means of interaction as described above may be used to calculate the contact-score. In particular embodiments, social-networking system 160 may compare the contact-score of each second user to a threshold contact-score. The social-networking system 160 may then only add to the user-list second users associated with contact-scores that exceed the threshold contact-score.

In particular embodiments, social-networking system 160 may generate a new user-list every time the first user accesses the social-networking system or requests to view one or more user-cards. In particular embodiments, the social-networking system 160 may store the user-list and the contact-scores associated with each second user of the user-list in a data store of social-networking system 160, and update the user-list each time it detects the first user's activities on mobile client system 130. For example, social-networking system 160 may consider adding second users when the first user calls a particular user for the first time, or sends a message to a particular user for the first time. In particular embodiments, social-networking system 160 may update the user-list for a first user at particular time intervals. The time interval for updating a user-list may be set automatically by the social-networking system 160 based on the frequency of the first user's activities. In particular embodiments, the first user may be given the option to determine how often the user-list is updated.

The first user of mobile client system 130 may be interested in seeing the user-list which has been generated for the first user. In particular embodiments, social-networking system 160 may send a user-list comprising all second users who may be included in user-cards for the first user as the list of contacts for the first user. In particular embodiments, social-networking system 160 may present an address book of contacts to the first user comprising friends of the first user on the social-networking system, and additionally contacts stored on mobile client system 130. In particular embodiments, the user-list may indicate to the first user the second users who are already friends with the first user on the social-networking system 160, and second users who are not friends of the first user. The first user may have the option of removing friends or requesting new friends depending on the current status of a second user on the user-list. In particular embodiments, the first user may remove a second user from the user-list completely. In particular embodiments, the first user may use query-filters as described above to see a subset of second users of the user-list corresponding to the particular query-filter.

Figure 11:
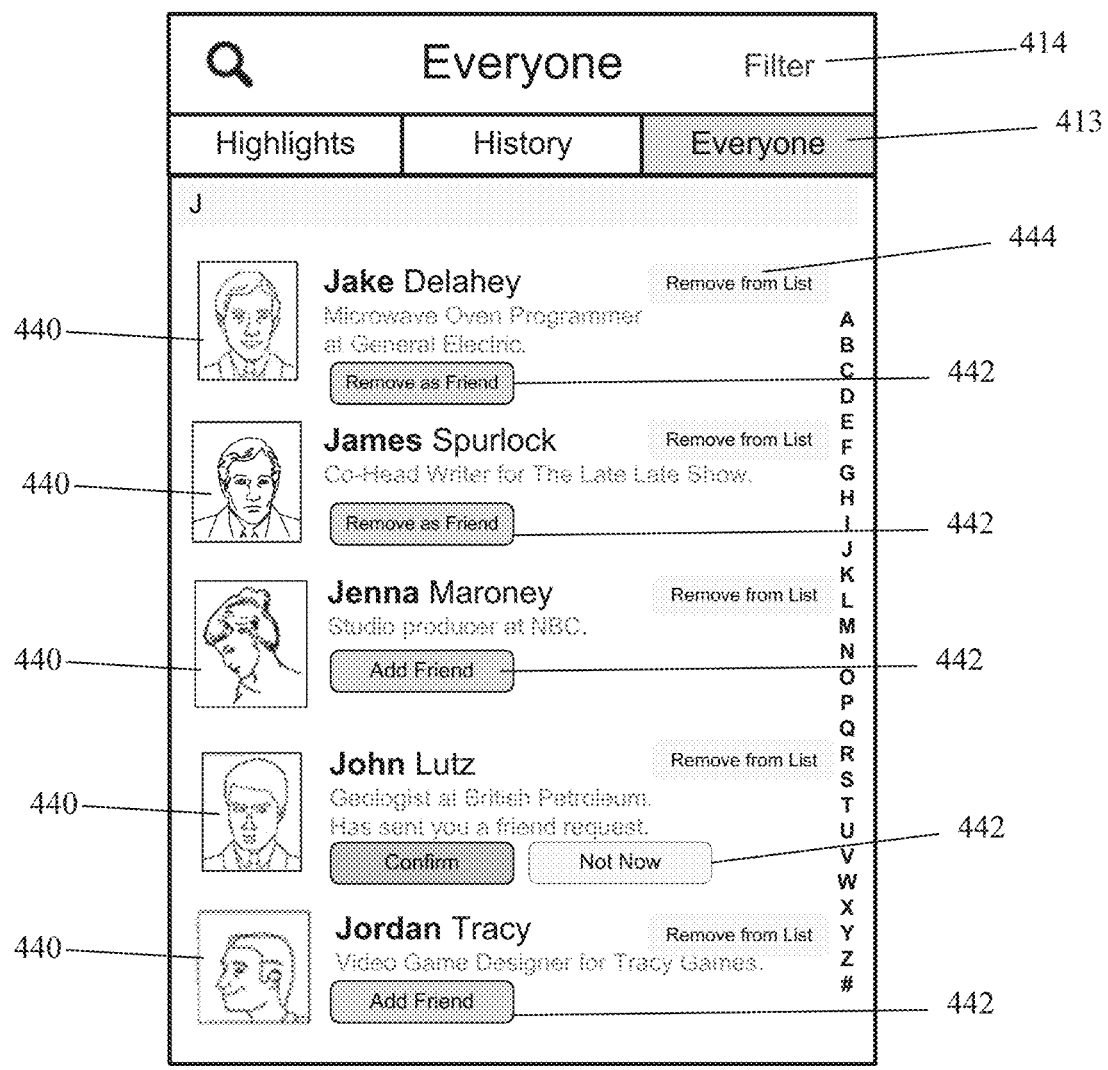
FIG. 11 illustrates an example user-list for all user contacts of a first user.

FIG. 11 illustrates an example user-list of contacts of the first user as determined by the social-networking system 160. The social-networking system 160 may access the social graph 200, and generate a list of second users 440 that have any association with the first user. The association may take place through the social-networking system 160, or may be through other means of interaction where the interaction has been recorded by social-networking system 160. Social-networking system 160 may calculate a contact score for each second user 440, and remove any second users 440 whose contact-scores are below a threshold contact-score. In response to a request by the first user to view the user-list 413, social-networking system 160 may send to the first user the user-list comprising second users 440. The second users 440 may be associated with interactive elements 442 based on the type of association between the first user and the particular second user. In particular embodiments, other interactive elements 444 may allow the first user to remove particular second users from the displayed user-list 413. In particular embodiments, the user-list may also display an interactive element 414 wherein the first user may filter the user-list based on additional criteria or query-filters.

Although the example of FIG. 11 displays contacts sorted in alphabetical order, this invention contemplates any method of arranging contacts, including, as examples and not by way of limitation, their contact-score; chronological (or reverse-chronological) order by the last time the first user interacted with the particular user; relevance of each particular user to the first user as calculated by the social-networking system 160; or by geographical proximity to the first user.

Figure 12:
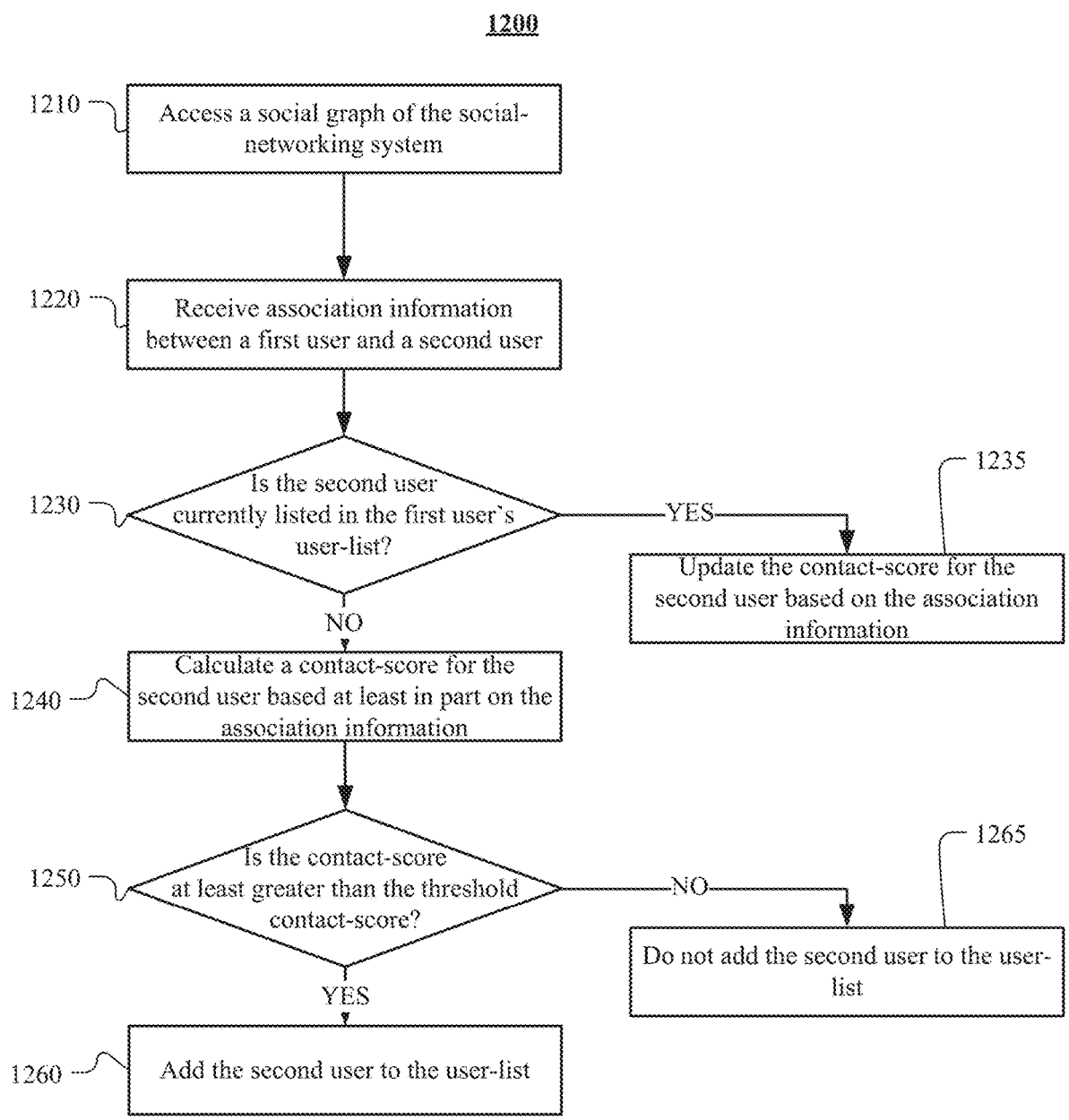
FIG. 12 illustrates an example method for updating a user-list based on association information.

FIG. 12 illustrates an example method 1200 for updating a user-list. The method may begin at step 1210, where social-networking system 160 may access a social graph 200 comprising a plurality of nodes and a plurality of edges 206 connecting the nodes. The nodes may comprise a first user node 202 and a plurality of second nodes (one or more user nodes 202, concepts nodes 204, or any combination thereof). At step 1220, social-networking system 160 may receive information associating the first user with one or more other users. The association information may comprise interactions between the first user and the one or more second users through social-networking system 160, or interactions between the first user and the one or more second users through other means wherein the interactions are recorded by social-networking system 160. At step 1230, social-networking system 160 may determine if the one or more second users are currently on the user-list for the first user.

At step 1235, if the second user is already on the user-list, then social-networking system 160 may update the second user's contact-score. At step 1240, if the second user is not on the user-list, social-networking system 160 may calculate a contact-score for the second user, based at least in part on the association information received in step 1220. At step 1250, the social-networking system 160 may compare the contact-score of the second user to a threshold contact-score. At step 1260, if the contact-score of the second user is at least greater than the threshold contact-score, then the second user is added to the user-list. At step 1265, if the contact-score of the second user is not greater than the threshold contact-score, then the second user is not added to the user-list.

Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for generating cards for the user including the particular steps of the method of FIG. 12, this disclosure contemplates any suitable method for generating cards for the user including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

In particular embodiments, the first user may select a "recent" option for the user-list 413 and user-card interface 410. With this option selected, social-networking system 160 may calculate user-scores and contact-scores for second users using a time-decaying social affinity of the first user with respect to the second user. In particular embodiments, the first user may also select a "less recent" option for the user-list 413 which specifies a time period prior to the time period specified for the "recent" option. The social affinity may be weighted with a time-decay which favors the specified time period. As an example and not by way of limitation, a particular second user may have been in a class together with the first user the previous semester, but is not currently in the same class as the first user. Thus, although the number of interactions between the first and second users is fairly high, if the first user selects the "recent" option, the second user's contact-score or user-score will be less than it would have been during the previous semester, and the second user may not appear on a user-list under the "recent" option. In the same example, if the first user selects the "less recent" option, the contact-score or user-score of the particular second user may be increased, or decreased by a smaller factor than with selection of the "recent" option. Under the "less recent" option, the second user may appear on the user-list, unlike the "recent" option.

In particular embodiments, selection of "recent" or "less recent" options may update user-cards 430A-C as an additional query-filter applied to the user-cards. As an example and not by way of limitation, a first user may select the "recent" option, and a user-card 430A-C currently displaying results for "People You Have Been Photographed With" may be updated to display "People You Have Been Photographed With Recently." Alternatively, in an example where the first user selects the "less recent" option, user-card 430A-C may be updated to display "People You Were Photographed With Last Month."

Figure 13:
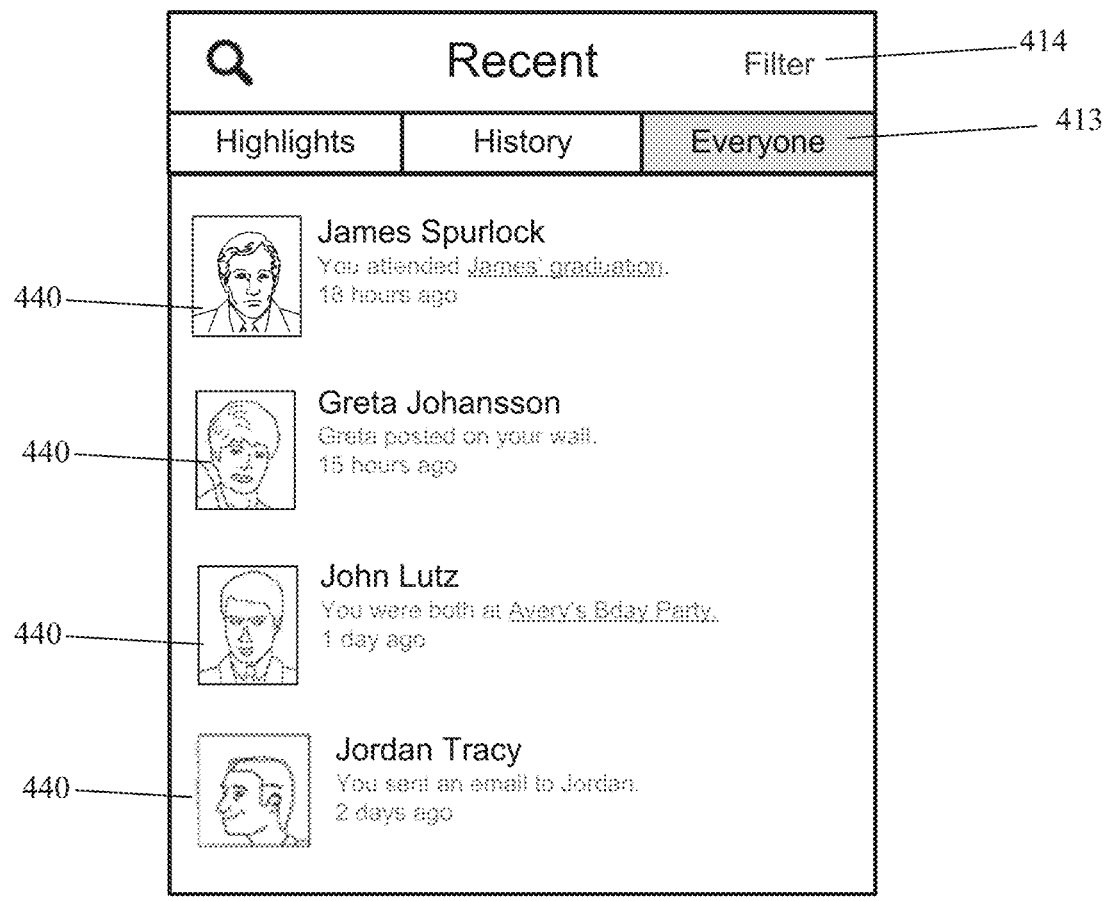
FIG. 13 illustrates an example user-list filtered for users with recent interactions.

FIG. 13 illustrates an example user-list of second users having recent interactions with the first user. An interactive element 414 for filtering the user-list may be selected and a query-filter applied to user-list 413 to show only second users with a recent interaction with the first user that is viewable by the first user. Second users 440 being displayed in the example of FIG. 13 may contain information describing recent interactions between the first user and the second user. In particular embodiments, the first user may select one of the second users 440 in order to view additional information about that particular second user, or to interact with that particular second user through the social-networking system 160. The first user may apply additional query-filters to the "recent" user-list 413 to narrow the list of second users 440 further.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 14:
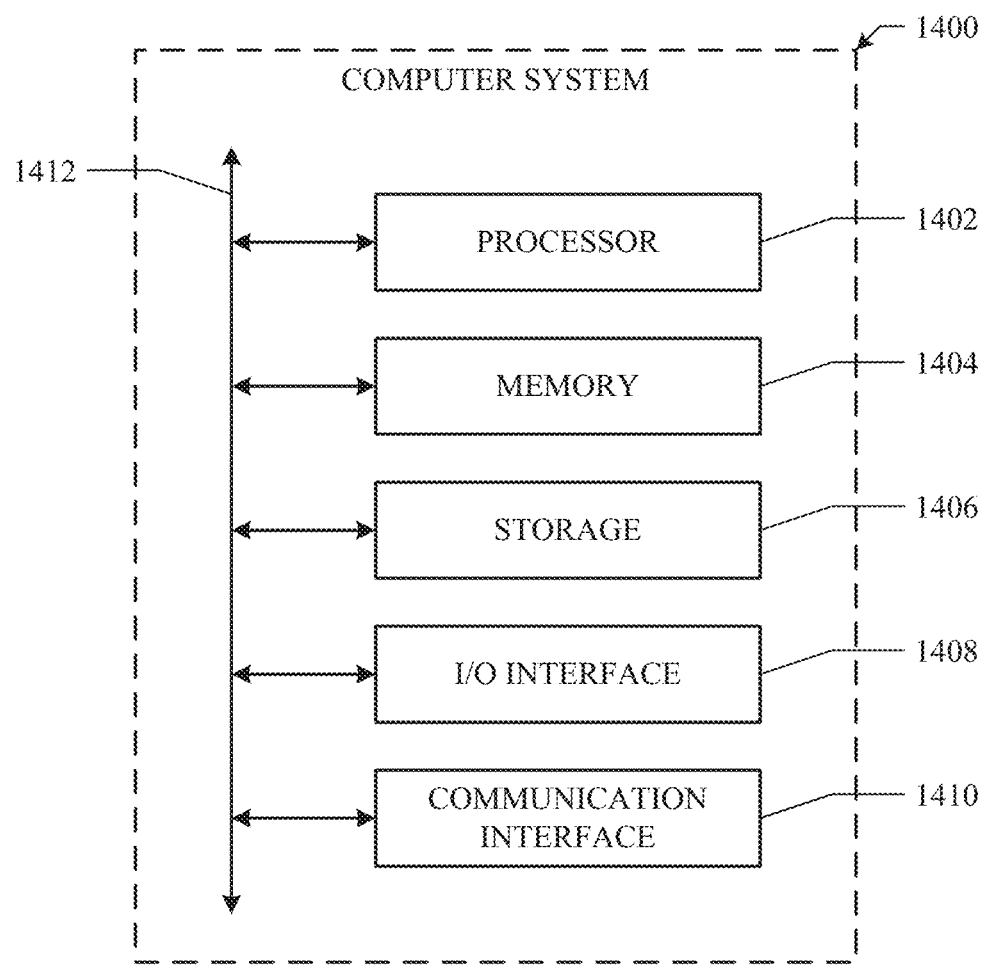
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a computing device:
   receiving, at the computing device from a client system associated with a first user, a request to access a user-card interface;
   generating, by the computing device in response to the request, a plurality of user-cards, each user-card being associated with a pre-selected query, each user-card comprising references to one or more second users matching the pre-selected query associated with the user-card;
   calculating, by the computing device, a user-card score for each user-card, wherein the user-card score represents a relevance of the pre-selected query associated with the user-card to the first user and a relevance of the one or more second users referenced in the user-card to the first user, the relevance of the second users referenced in the user-card being based on at least an affinity coefficient of the first user with respect to the second users, wherein each user-card further comprises one or more interactive elements with respect to one or more second users referenced in the user-card; and
   sending, from the computing device to the client system responsive to the request, instructions for presenting the user-card interface, wherein the user-card interface comprises a plurality of user-cards, the user-cards being presented in ranked order based on the user-card score associated with each user-card.

2. The method of claim 1, wherein the relevance of the pre-selected query associated with the user-card to the first user is based on the one or more second users matching the pre-selected query.

3. The method of claim 1, wherein the one or more interactive elements are operable to initiate one or more of:
   sending a friend request to the referenced second user;
   accepting a friend request from the referenced second user;
   liking a status or wall post of the referenced second user;
   sending a message to the referenced second user;
   posting a message on a profile page of the referenced second user; or
   viewing user-profile information about the referenced second user.

4. The method of claim 1, further comprising:
   receiving, from the client system, an input to apply a query-filter to a particular user-card; and
   applying a query-filter to one or more other user-cards based on the input.

5. The method of claim 1, further comprising:
   applying a query-filter to one or more user-cards;
   re-calculating the user-card score for the one or more user-cards; and
   updating the ranked order of the user-cards being presented based on the re-calculated user-card scores.

6. The method of claim 1, further comprising:
   receiving, from the client system, an input indicating an association between the first user and the pre-selected query corresponding to a particular user-card;
   re-calculating the user-card scores for one or more user-cards based at least in part on the input; and
   updating the ranked order of the user-cards being presented based on the re-calculated user-card scores.

7. The method of claim 1, further comprising:
receiving, from the client system, an input indicating a user interaction with a particular user-card, the particular user-card comprising references to a subset of second users; and
modifying, responsive to the input, the particular user-card to further comprise references to a superset of second users, the superset of second users comprising the subset of second users and one or more additional second users.

8. The method of claim 1, wherein each user-card is dynamically generated based at least in part on an action associated with the first user recorded by a social-networking system.

9. The method of claim 1, wherein the pre-selected query associated with each user-card is dynamically generated based at least in part on an action associated with the first user recorded by a social-networking system.

10. The method of claim 1, wherein the relevance of the pre-selected query associated with each user-card to the first user is based at least in part on a location associated with the first user.

11. The method of claim 1, wherein the references to one or more second users comprise one or more of:
an image associated with the referenced second user;
a name of the referenced second user;
an email address associated with the referenced second user;
contact information associated with the referenced second user;
a user ID associated with the referenced second user; or
user-profile information on a social-networking system associated with the referenced second user.

12. The method of claim 1, further comprising:
accessing a social graph comprising a plurality of nodes and a plurality of edges connecting the nodes, each of the edges between two of the nodes representing a single degree of separation between them, the nodes comprising:
a first node corresponding to the first user; and
a plurality of second nodes corresponding to a plurality of second users, respectively.

13. The method of claim 12, wherein:
each pre-selected query is a structured query referencing one or more nodes or one or more edges of the social graph; and
each user-card comprises references to one or more second users corresponding to one or more second nodes of the plurality of second nodes, respectively, matching the pre-selected query associated with the user-card.

14. The method of claim 12, further comprising:
receiving, from the client system, an input indicating an association between the first user and the pre-selected query associated with a particular user-card; and
adding a reference to the first node in the social graph for the pre-selected query corresponding to the particular user-card.

15. The method of claim 1, further comprising, for each user-card:
identifying one or more second users matching the pre-selected query associated with the user card;
calculating a user-score for each identified second user, wherein the user-score is based at least in part on an affinity coefficient of the first user with respect to the identified second user; and
generating the user-card to include references to one or more of the identified second users having a user-score above a threshold user-score.

16. The method of claim 15, wherein the references to one or more second users are presented in ranked order based on the user-score associated with each second user.

17. The method of claim 15, wherein the user-score is further based in part on a contact-score between the first user and the identified second-user, wherein the contact-score is based at least in part on one or more actions, recorded by a social-networking system, associated with the first user or the second user, that indicate an affinity of the first user with respect to the second user.

18. One or more computer-readable non-transitory storage media embodying software that is operable when executed to:
receive, from a client system associated with a first user, a request to access a user-card interface;
generate, in response to the request, a plurality of user-cards, each user-card being associated with a pre-selected query, each user-card comprising references to one or more second users matching the pre-selected query associated with the user-card;
calculate a user-card score for each user-card, wherein the user-card score represents a relevance of the pre-selected query associated with the user-card to the first user and a relevance of the one or more second users referenced in the user-card to the first user, the relevance of the second users referenced in the user-card being based on at least an affinity coefficient of the first user with respect to the second users, wherein each user-card further comprises one or more interactive elements with respect to one or more second users referenced in the user-card; and
send, to the client system responsive to the request, instructions for presenting the user-card interface, wherein the user-card interface comprises a plurality of user-cards, the user-cards being presented in ranked order based on the user-card score associated with each user-card.

19. A system comprising: one or more processors; and a memory coupled to the processors comprising instructions executable by the processors, the processors operable when executing the instructions to:
receive, from a client system associated with a first user, a request to access a user-card interface;
generate, in response to the request, a plurality of user-cards, each user-card being associated with a pre-selected query, each user-card comprising references to one or more second users matching the pre-selected query associated with the user-card;
calculate a user-card score for each user-card, wherein the user-card score represents a relevance of the pre-selected query associated with the user-card to the first user and a relevance of the one or more second users referenced in the user-card to the first user, the relevance of the second users referenced in the user-card being based on at least an affinity coefficient of the first user with respect to the second users, wherein each user-card further comprises one or more interactive elements with respect to one or more second users referenced in the user-card; and
send, to the client system responsive to the request, instructions for presenting the user-card interface, wherein the user-card interface comprises a plurality of user-cards, the user-cards being presented in ranked order based on the user-card score associated with each user-card.

20. The method of claim 1, wherein each pre-selected query is pre-generated by the computing device.

21. The method of claim 1, wherein each user-card of the plurality of user-cards within the user-card interface is selectable to be removed from the user-card interface.

* * * * *